US008095169B2

(12) United States Patent
Ohwatari et al.

(10) Patent No.: US 8,095,169 B2
(45) Date of Patent: Jan. 10, 2012

(54) RADIO COMMUNICATION APPARATUS AND RADIO COMMUNICATION METHOD

(75) Inventors: Yusuke Ohwatari, Yokohama (JP); Anass Benjebbour, Yokosuka (JP); Tomoyuki Ooya, Yokohama (JP); Junichiro Hagiwara, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 365 days.

(21) Appl. No.: 12/432,174

(22) Filed: Apr. 29, 2009

(65) Prior Publication Data

US 2009/0280855 A1 Nov. 12, 2009

(30) Foreign Application Priority Data

May 12, 2008 (JP) ................................ 2008-125340

(51) Int. Cl.
*H04B 1/00* (2006.01)

(52) U.S. Cl. ...................... 455/522; 455/509; 455/452.1

(58) Field of Classification Search .................. 455/522, 455/450, 452.1, 509, 515
See application file for complete search history.

(56) References Cited

U.S. PATENT DOCUMENTS

| | | | | |
|---|---|---|---|---|
| 7,715,485 | B1 * | 5/2010 | Schlegel et al. | 375/260 |
| 7,933,560 | B2 * | 4/2011 | Han et al. | 455/69 |
| 2007/0270173 | A1 * | 11/2007 | Niu et al. | 455/522 |
| 2009/0227278 | A1 * | 9/2009 | Cho et al. | 455/522 |

OTHER PUBLICATIONS

G. J. Foschini, et al., "Mimo Wireless and Mobile Communications, Coordinating multiple antenna cellular networks to achieve enormous spectral efficiency", IEE Proc.-Commun., vol. 153, No. 4, Aug. 2006, pp. 548-555.

Shenfa Liu, et al., "Multi-level Zero-forcing Method for Multiuser Downlink System with Per-antenna Power Constraint", IEEE, VTC 2007-Spring, Apr. 2007, pp. 2248-2252.

Wei Yu, et al., "Transmitter Optimization for the Multi-Antenna Downlink With Per-Antenna Power Constraints", IEEE Transactions on Signal Processing, vol. 55, No. 6, Jun. 2007, pp. 2646-2660.

* cited by examiner

*Primary Examiner* — James H Cho
(74) *Attorney, Agent, or Firm* — Oblon, Spivak, McClelland, Maier & Neustadt, L.L.P.

(57) ABSTRACT

A disclosed radio communication apparatus includes a preceding unit configured to precode multiple streams, a splitting unit configured to split the precoded streams into two or more stream sets each including one or more streams, a sub power optimization unit configured to execute an iterative transmit power optimization algorithm on each of the split stream sets to determine respective transmit power levels for the individual stream sets, a power optimization unit configured to execute the iterative transmit power optimization algorithm by using the determined transmit power levels as initial values for the iterative transmit power optimization algorithm to determine respective transmit power levels for the individual streams, and a transmission unit configured to transmit radio signals from individual transmit antennas at the determined transmit power levels.

14 Claims, 12 Drawing Sheets

START
61
SET INITIAL VALUE
62
SPLIT TRANSMIT STREAM
63
FIRST SUB-OPTIMIZATION
63
D-TH SUB-OPTIMIZATION
64
MERGED OPTIMIZATION
65
OUTPUT
END

RADIO COMMUNICATION APPARATUS AND RADIO COMMUNICATION METHOD

BACKGROUND OF THE INVENTION

1. Field of the Invention

Embodiments discussed herein are directed to an apparatus and method for radio communication under the condition where some constraints on transmit power levels are applied for each transmit antenna or each group of transmit antennas in multi-user MIMO downlinks.

2. Description of the Related Art

In recent years, a MIMO (Multiple-Input Multiple-Output) transmission scheme has been intensively investigated for improvement of frequency or spectral efficiency and increase in communication capacity. In this MIMO transmission scheme, a multi-user (MU)-MIMO system designed to apply the MIMO transmission scheme to multiple users for further improvement of the spectral efficiency is attracting attention. Furthermore, a system designed for MU-MIMO coordinated base stations transmission is being studied, and it is reported that it can realize significant improvement of throughput.

In this MU-MIMO coordinated base stations transmission system, since different power amplifiers are used for different antennas of base stations or different base stations, respective characteristics of the power amplifiers must be taken into account. Particularly if data streams transmitted from users are precoded based on feedback information such as channel information supplied from the users, the levels of transmit power allocated for the different streams transmitted from the users depending on precoding weights of transmit antennas must be adjusted each time of updating the feedback information such as the channel information because of constraints on transmit power imposed on the base stations.

A first article G. J. Foschini, K. Karakayali and R. A. Valenzuela, "Coordinating multiple antenna cellular networks to achieve enormous spectral efficiency", IEE Proceedings Communications, vol. 153, No. 4, pp. 548-555, August 2006 discloses that block diagonalization zero-forcing, which is a preceding scheme designed for transmission without interference among individual users, is used in a MU-MIMO coordinated base stations transmission system in consideration of respective characteristics of individual power amplifiers to propose and solve a transmit power optimization problem that can realize uniform allocation of channel capacity for individual users. In this article, it is also shown that this approach can significantly improve the channel capacity compared to systems without the coordination among base stations.

A second article S. Liu, N. Hu, Z. He, K. Niu and W. Wu, "Multi-level zero-forcing method for multiuser downlink system with per-antenna power constraint", VTC 2007-Spring, pp. 2248-2252, April 2007 discloses optimization problems for optimizing preceding weights and transmit power for preceding in the above MU-MIMO coordinated base stations transmission system such that the channel capacity of the overall system can be maximized. In this article, it is also shown that this approach can improve the channel capacity.

A third article W. Yu and T. Lan, "Transmitter optimization for the multi-antenna downlink with per-antenna power constraints", IEEE Trans., Signal Processing, pp. 2646-2660, June 2007 discloses an optimization problem using duality of uplink and downlink and a solution method in the above MU-MIMO coordinated base stations transmission system.

The power allocation optimization problems as stated above correspond to constrained nonlinear optimization problems, and higher computational complexity may be required to solve them. For example, in the case where the power allocation optimization problems are solved with use of an interior point method in accordance with a steepest descent method, the solution can be analytically obtained in a relatively simple algorithm, but higher computational complexity may be required for convergence.

The first and second articles, however, have no investigation on reduction in the computational complexity for solving the optimization problems as proposed in the articles.

Also, the third article is directed to only linear preceding and makes no mention of nonlinear preceding.

SUMMARY OF THE INVENTION

Accordingly, it is an object of the present invention to provide radio communication apparatus and method that can compute an optimum transmit power allocation for individual users while reducing the computational complexity associated with that calculation under the situation where respective transmit power levels are constrained for different transmit antennas and different groups of transmit antennas.

One aspect of the present invention relates to a radio communication apparatus for transmitting a radio signal to multiple users via multiple transmit antenna groups at appropriate transmit power levels, each of the transmit antenna groups including one or more transmit antennas, the transmit antenna groups having respective transmit power constraints, the apparatus comprising: a preceding unit configured to precode multiple streams; a splitting unit configured to split the precoded streams into two or more stream sets each including one or more streams; a sub power optimization unit configured to execute an iterative transmit power optimization algorithm on each of the split stream sets to determine respective transmit power levels for the individual stream sets; a power optimization unit configured to execute the iterative transmit power optimization algorithm by using the determined transmit power levels as initial values for the iterative transmit power optimization algorithm to determine respective transmit power levels for the individual streams; and a transmission unit configured to transmit radio signals from individual transmit antennas at the determined transmit power levels.

According to the aspect of present invention, optimum transmit power levels can be allocated for individual users while reducing the computational complexity associated with the calculation under the situation where respective transmit power levels are constrained for different transmit antennas and different groups of transmit antennas.

Additional objects and advantages of the invention (embodiment) will be set forth in part in the description which follows, and in part will become obvious from the description, or may be learned by practice of the invention. The object and advantages of the invention will be realized and attained by means of the elements and combinations particularly pointed out in the appended claims.

It is to be understood that both the foregoing general description and the following detailed description are exemplary and explanatory only and are not restrictive of the invention as claimed.

DETAILED DESCRIPTION OF THE PREFERRED EMBODIMENTS

Figure 1:
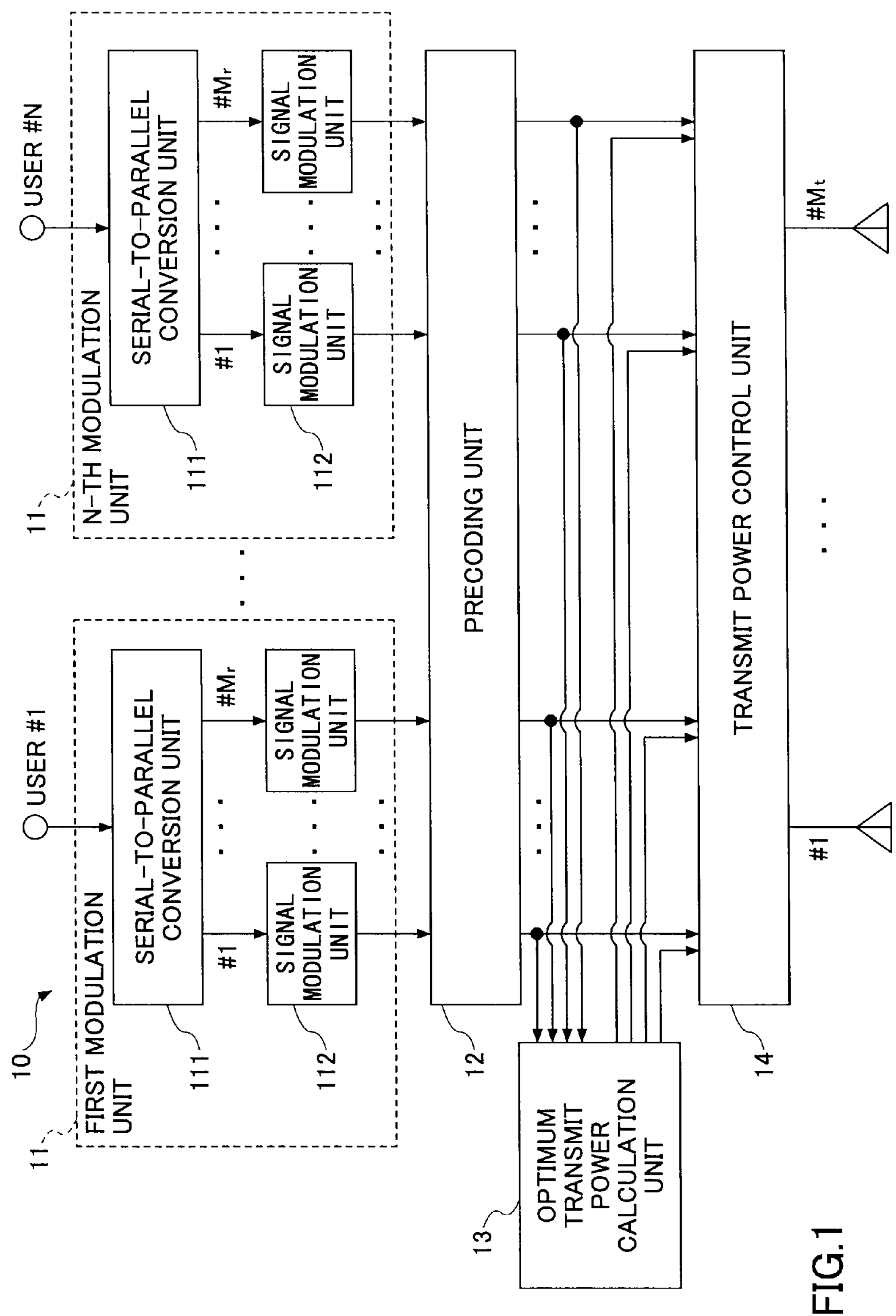
FIG. 1 illustrates an exemplary arrangement of a radio communication apparatus according to a first embodiment.

Embodiments of the present invention are described with reference to the accompanying drawings.

One aspect of the present invention relates to a radio communication apparatus for using multiple transmit antennas to precode transmit streams, allocating respective optimum transmit power levels for individual users under respective transmit power constraints for the transmit antennas or transmit antenna groups of the transmit antennas, and transmitting radio signals at the allocated transmit power levels. The radio communication apparatus may include respective user modulation units, a preceding unit for precoding signals supplied from the modulation units, an optimum transmit power calculation unit for splitting a power optimization problem based on some outputs of the preceding unit into sub power optimization problems, processing the sub power optimization problems in parallel, and solving the power optimization problem by merging the solutions of the sub power optimization problems, and a transmit power control unit for generating transmit signals from signals supplied from the modulation unit, the preceding unit and the optimum transmit power calculation unit.

According to the aspect of the present invention, the optimum transmit power calculation unit calculates substantially optimum transmit power levels for individual sub power optimization problems and merges the calculated transmit power levels to solve the power optimization problem. As a result, optimum transmit power allocation can be achieved under respective transmit power limits for individual transmit antennas or transmit antenna groups while reducing computational complexity.

In the sub power optimization problem and/or the power optimization problem, an iterative transmit power optimization algorithm is performed to derive an extreme value for an objective function including a term associated with MIMO channel capacity $C_k$. As one example, the objective function may include the term associated with MIMO channel capacity $C_k$ and a term associated with a product of a barrier parameter r(i) and a barrier function g(i). The barrier parameter r(i) is updated such that the barrier parameter r(i) may have a smaller value for more iterations. The barrier function g(i) includes a term specified as a difference between the amount of power $\Sigma_{kj}|w_{k,j,q}|^2P_{k,j}$ allocated to all transmit streams from a certain transmit antenna q and an upper transmit power limit $P_{max,q}$ for that certain transmit antenna.

Also, the optimum transmit power calculation unit of the radio communication apparatus may preferably split the power optimization problem into multiple sub power optimization problems based on an eigenvalue distribution representing quality of transmit streams for individual users. According to this feature, it is possible to split into sub power optimization problems depending on bias of the eigenvalue distribution. For example, all streams may be split into streams associated with an upper 20% of eigenvalues and streams associated with the other 80% of eigenvalues in accordance with the eigenvalue distribution or magnitude of eigenvalues. In this case, a larger amount of power (for example, 80% of power) may be allocated to the upper 20% of streams, and the remaining amount of power (for example, 20% of power) may be allocated to the other 80% of streams. According to this feature, it is possible to realize power allocation suitable for radio propagation states. Since power levels can be assigned for individual streams in consideration of eigenvalues of the streams, power allocation can be realized depending on communication states, resulting in reduction in iterations and computational complexity. Although an arbitrary number of sub power problems may be provided, as one example, the optimization problem may be split into two sub optimization problem based on the Pareto Law (80%, 20%) as stated above.

Also, the optimum transmit power calculation unit of the radio communication apparatus may preferably optimize power allocation under the above constraints using the interior point method combined with the steepest descent method. According to this feature, it is possible to use a simple algorithm to find an optimum solution analytically.

Also, the optimum transmit power calculation unit of the radio communication apparatus may preferably use the formula (21) as presented below as iteration convergence conditions for the steepest descent method. According to this feature, it is possible to determine a convergence point for the steepest descent method and find an optimum solution.

Also, the optimum transmit power calculation unit of the radio communication apparatus may preferably use the formula (23) as presented below as step iteration convergence conditions for the interior point method. According to this feature, it is possible to determine convergence points for individual steps in the interior point method and find an optimum solution.

Also, the optimum transmit power calculation unit of the radio communication apparatus may preferably optimize power allocation under the above constraints to make respective channel capacities for individual users uniform. According to this feature, it is possible to find an optimum solution such that the respective channel capacities for individual users may be made uniform after the power allocation.

Also, the optimum transmit power calculation unit of the radio communication apparatus may preferably optimize power allocation under the above constraints to maximize channel capacity for an overall system. According to this feature, it is possible to find an optimum solution to maximize a sum of the respective channel capacities for individual users after the power allocation.

Another aspect of the present invention relates to a radio communication method for using multiple transmit antennas to precode transmit streams, allocating respective optimum transmit power levels for individual users under respective transmit power constraints for the transmit antennas or transmit antenna groups of the transmit antennas, and transmitting radio signals at the allocated transmit power levels. The radio communication method may include respective user modulation steps, a preceding step for preceding signals supplied from the modulation steps, an optimum transmit power calculation step for splitting a power optimization problem based on some outputs of the preceding step into sub power optimization problems, processing the sub power optimization problems in parallel, and solving the power optimization problem by merging the solutions of the sub power optimization problems, and a transmit power control step for generating transmit signals from signals supplied from the modulation step, the preceding step and the optimum transmit power calculation step.

According to the aspect of the present invention, in the optimum transmit power calculation step, substantially optimum transmit power levels are calculated for individual sub power optimization problems, and the calculated transmit power levels are merged to solve the power optimization problem. As a result, optimum transmit power allocation can be achieved under respective transmit power limits for individual transmit antennas or transmit antenna groups while reducing computational complexity.

Also, in the optimum transmit power calculation step, the power optimization problem may be preferably split into multiple sub power optimization problems based on an eigenvalue distribution representing quality of transmit streams for individual users. According to this feature, it is possible to split into sub power optimization problems depending on bias of the eigenvalue distribution. According to this feature, even if the split is not applied, a sub power optimization problem can be formulated such that a larger amount of power may be allocated to streams with greater eigenvalues, resulting in reduction of iterations and computational complexity.

Also, in the optimum transmit power calculation step, power allocation may be preferably optimized under the above constraints using the interior point method combined with the steepest descent method. According to this feature, it is possible to use a simple algorithm to find an optimum solution analytically.

Also, in the optimum transmit power calculation step, the formula (21) as presented below may be preferably used as iteration convergence conditions for the steepest descent method. According to this feature, it is possible to determine a convergence point for the steepest descent method and find an optimum solution.

Also, in the optimum transmit power calculation step, the formula (23) as presented below may be preferably used as step iteration convergence conditions for the interior point method. According to this feature, it is possible to determine convergence points for individual steps in the interior point method and find an optimum solution.

Also, in the optimum transmit power calculation step, power allocation may be preferably optimized under the above constraints to make respective channel capacities for individual users uniform. According to this feature, it is possible to find an optimum solution such that the respective channel capacities for individual users may be made uniform after the power allocation.

Also, in the optimum transmit power calculation step, power allocation may be preferably optimized under the above constraints to maximize channel capacity for an overall system. According to this feature, it is possible to find an optimum solution to maximize a sum of the respective channel capacities for individual users after the power allocation.

According to the radio communication apparatus and the radio communication method of the present invention, a transmit power allocation optimization problem under some constraints on respective transmit power limits for individual transmit antennas or individual transmit antenna groups is divided into multiple sub power optimization problems, which are processed in parallel and then merged. As a result, optimum transmit power allocation can be determined for individual users, and the associated computational complexity can be reduced.

Some embodiments of the present invention are described with reference to the accompanying drawings.

First Embodiment

Radio communication apparatus and method according to the first embodiment may determine transmit power levels for transmit streams for individual users under the condition where respective transmit power levels of different antennas or transmit antenna groups are restricted and transmit signals at the determined transmit power levels.

FIG. 1 illustrates an exemplary arrangement of a radio communication apparatus 10 according to the first embodiment. As illustrated in FIG. 1, the radio communication apparatus 10 includes a number of modulation units 11 corresponding to the number (N) of users, a preceding unit 12, an optimum transmit power calculation unit 13 and a transmit power control unit 14. Each of the modulation units 11 includes a serial-to-parallel conversion unit 111 and signal modulation units 112.

Figure 2:
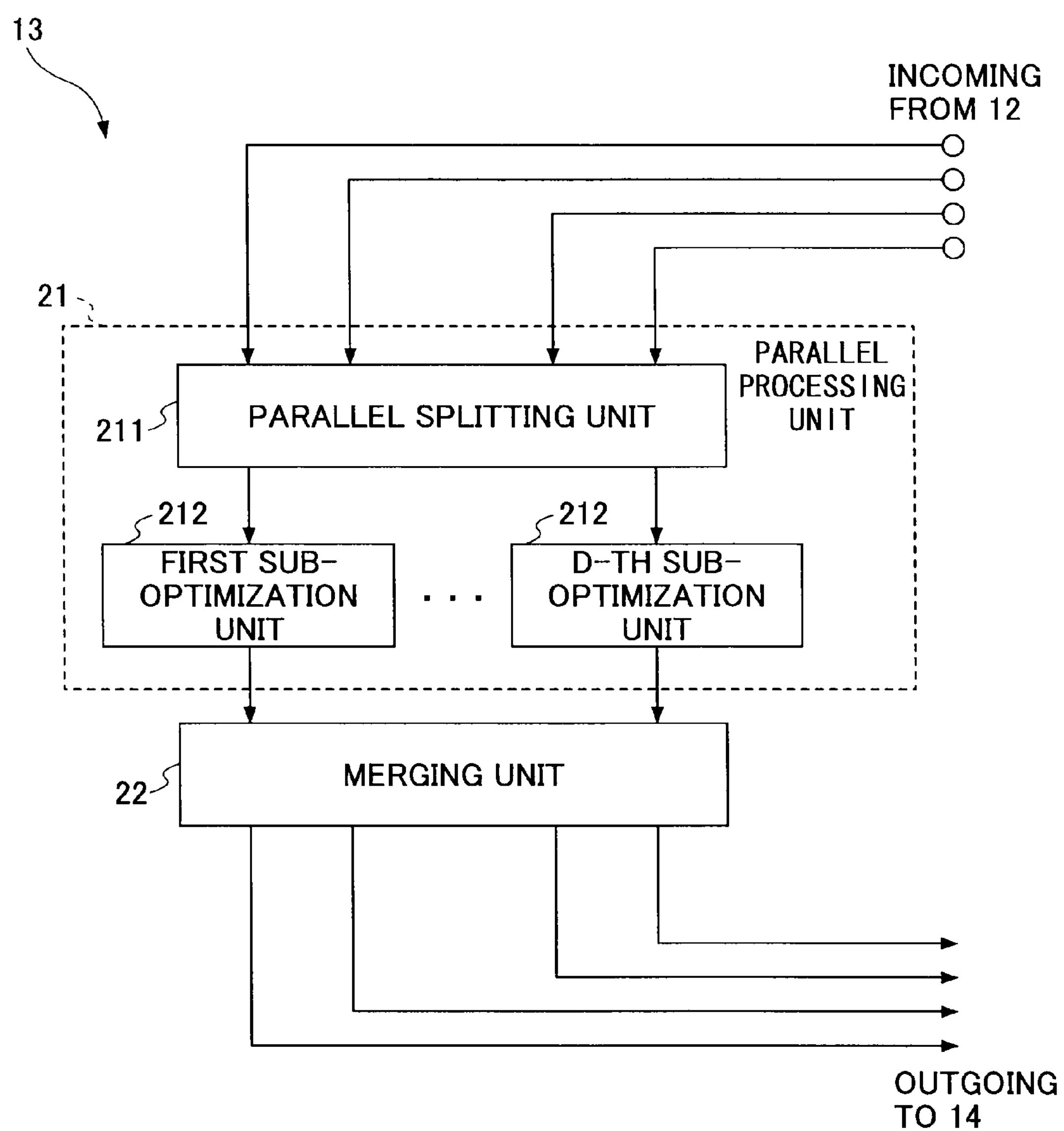
FIG. 2 illustrates an exemplary arrangement of an optimum transmit power calculation unit in the radio communication apparatus according to the first embodiment.

FIG. 2 illustrates an exemplary arrangement of the optimum transmit power calculation unit 13 according to the first embodiment. The optimum transmit power calculation unit 13 includes a parallel processing unit 21 and a merging unit 22. The parallel processing unit 21 includes a parallel splitting unit 211 and D sub-optimization units 212. The number D may be an arbitrary positive integer. Typically, the number D may have an upper limit such as the number of streams whose power is to be controlled or the total number of eigenvalues for a channel matrix and may be an arbitrary value smaller than the upper limit.

Next, exemplary operations of the above-mentioned radio communication apparatus and an exemplary radio communication method according to the first embodiment are described below. In the following, a channel information based block diagonalization zero-forcing (BD-ZF) is used for preceding in MU-MIMO transmission with use of $M_t$ transmit antennas, N users and $M_r$ user antennas.

In other embodiments, any other channel information based MU-MIMO precoder, such as ZF, MMSE or DPC, may be used for the preceding. Alternatively, another type of preceding of selecting transmit weight vectors from a codebook may be used.

In the modulation unit 11 in FIG. 1, the serial-to-parallel conversion unit 111 assigns an information signal sequence to be transmitted to the associated user to individual transmit streams. The signal modulation units 112 modulate the transmit streams and generate transmit signals $s_{k,j}(1 \leqq k \leqq N$ and $1 \leqq j \leqq M_r)$. The notation $s_{k,j}$ represents a transmit signal for transmitting the j-th transmit stream for the k-th user. Hereinafter, a transmit signal may be referred to as a stream or a transmit stream. A $M_r$-dimensional transmit signal vector sk for the k-th user is defined as $$s_k=[s_{k,1}, \ldots, s_{k,j}, \ldots s_{k,Mr}]^T \quad (1),$$

where the superscript T represents transposition.

Here, letting a channel matrix of $M_r \times M_t$ MIMO channels for the k-th user be $H_k$, a BD-ZF transmit weight matrix $W_{BD\text{-}ZF,k}$ of size $M_t \times M_r$ for the k-th user is generated to satisfy the formula, $$H_k W_{BD\text{-}ZF,m}=0(k \neq m) \quad (2).$$

An equivalent channel matrix $H_k'$ of size $M_r \times M_r$ for the k-th user resulting from application of the BD-ZF is defined as follows and is subjected to singular value decomposition (SVD).

$$H_k' = H_k W_{BD-ZF,k} = U_k \Lambda_k V_k^H \quad (3)$$

$$\Lambda_k = \begin{bmatrix} \sqrt{\lambda_{k,1}} & \cdots & 0 \\ \vdots & \ddots & \vdots \\ 0 & \cdots & \sqrt{\lambda_{k,M_r}} \end{bmatrix},$$

where the superscript H represents a Hermitian transpose and $\lambda_{k,j}$ represents an eigenvalue of $H_k'^H H_k'$.

Using $V_k$ obtained from the above equation and the $W_{BD\text{-}ZF,k}$, let a transmit weight matrix of size $M_t \times M_r$ for the k-th user be $W_k$. In other words, $$W_k = W_{BD-ZF,k} V_k = \begin{bmatrix} w_{k,1,1} & \cdots & w_{k,M_t,1} \\ \vdots & \ddots & \vdots \\ w_{k,1,M_r} & \cdots & w_{k,M_t,M_r} \end{bmatrix}. \quad (4)$$

The precoding unit 12 derives the matrix $W_k$ and supplies components $w_{k,q,j}(1 \leqq q \leqq M_t)$ and $\lambda_{k,j}$ of the matrix $W_k$ as transmit weight related information to the optimum transmit power calculation unit 13. Also, the preceding unit 12 supplies the matrix $W_k$ and the vector $s_k$ to the transmit power control unit 14.

The transmit power control unit 14 in turn uses the supplied $W_k$ and $s_k$ together with transmit power $P_{k,j}$ assigned to the j-th transmit stream for the k-th user that is derived in the optimum transmit power calculation unit 13 as discussed below to generate an $M_t$-dimensional transmit signal vector $x_k$ after the preceding as follows, and supplies the vector $x_k$ to users, $$x_k = W_k \begin{bmatrix} \sqrt{P_{k,1}} & \cdots & 0 \\ \vdots & \ddots & \vdots \\ 0 & \cdots & \sqrt{P_{k,j}} \end{bmatrix} s_k. \quad (5)$$

The diagonal matrix $P_k$ with $\sqrt{P_{k,i}}$ $(1 \leqq i \leqq j)$ represents adjustment amounts for adjusting transmit power levels appropriately.

Also, letting an $M_r$-dimensional received signal vector for the k-th user be $y_k$ and an $M_r$-dimensional noise vector be $n_k$, the received signal is represented as follows, $$y_k=H_k x_k+n_k \quad (6).$$

Here, letting a received weight matrix of size $M_r \times M_r$ for the k-th user be $U_k^H$ in the formula (3), multiplication of the received weight matrix $U_k^H$ and the received signal vector $y_k$ is represented as follows, $$\begin{aligned} U_k^H y_k &= U_k^H H_k x_k + U_k^H n_k \\ &= U_k^H H_k W_{BD-ZF,k} V_k^H P_k s_k + U_k^H n_k \\ &= \Lambda_k P_k s_k + U_k^H n_k \\ &= \begin{bmatrix} \sqrt{\lambda_{k,1}} & \cdots & 0 \\ \vdots & \ddots & \vdots \\ 0 & \cdots & \sqrt{\lambda_{k,M_r}} \end{bmatrix} \begin{bmatrix} \sqrt{P_{k,1}} & \cdots & 0 \\ \vdots & \ddots & \vdots \\ 0 & \cdots & \sqrt{P_{k,j}} \end{bmatrix} s_k + U_k^H n. \end{aligned} \quad (7)$$

Thus, this exhibits that signals that have been spatially multiplexed and transmitted to users can be received without interference. Also, letting the noise power be $\sigma^2$, a received $SNR_{k,j}$ for the j-th transmit stream for the k-th user is represented as follows, $$SNR_{k,j} = \frac{\lambda_{k,j} P_{k,j}}{\sigma^2}. \quad (8)$$

Using this received $SNR_{k,j}$, a MIMO channel capacity $C_k$ for the k-th user is represented as follows, $$\begin{aligned} C_k &= \sum_{j=1}^{M_r} \log_2(1 + SNR_{k,j}) \\ &= \sum_{j=1}^{M_r} \log_2\left(1 + \frac{\lambda_{k,j} P_{k,j}}{\sigma^2}\right). \end{aligned} \quad (9)$$

Next, exemplary operations of the optimum transmit power calculation unit 13 are described below. The optimum transmit power calculation unit 13 receives the transmit weight components $w_{k,q,j}$ of the transmit weight matrix $W_k$ and the eigenvalues $\lambda_{k,j}$ as transmit weight related information from the preceding unit 12 and uses them to derive $P_{k,j}$ to satisfy a transmit power limit value $P_{max,q}$ of the q-th transmit antenna. Specifically, this may correspond to solving an optimization problem as follows, $$\text{maximize} \min_k C_k = \min_k \sum_{j=1}^{M_r} \log_2(1 + SNR_{k,j}) \quad (10)$$

$$\text{s.t.} \sum_{k=1}^{N} \sum_{j=1}^{M_r} |w_{k,q,j}|^2 P_{k,j} \leq P_{max,q} \quad (11)$$

$$P_{k,j} \geq 0 \ \forall \ k, j. \quad (12)$$

The formula (10) for the optimization problem means maximization of a minimum user capacity among all users. By solving the optimization problem, the respective channel capacities can be made almost uniform over all the users, which is referred to as Fairness criteria herein.

The optimization problem can be solved based on an interior point method. According to this interior point method, a barrier parameter r(i) for adjusting values of the barrier function $g(P_{k,j})$ is added to the formula (10), and a new optimization problem for maximizing a function without constraints (11) and (12) is solved. Here, the parameter i represents the number of step iterations in the interior point method as discussed in detail below. Specifically, it starts with a greater barrier parameter, and the optimum power $P_{k,j}$ is calculated for each barrier parameter. The calculated value is used as an initial value to iterate the process while decreasing the barrier parameter. Once the barrier parameter r(i) reaches a sufficiently small value, the original constrained optimization problem can be solved. The new optimization problem with use of the barrier function and the barrier parameter can be represented as follows, $$\text{maximize } F = \min_{k} C_k + r(i)g(P_{k,j}), \tag{13}$$

where F is an objective function for the new optimization problem. The barrier function $g(P_{k,j})$ may be used as follows, $$g(P_{k,j}) = -\sum_{q=1}^{M_t}\left(P_{max,q} - \sum_{k=1}^{N}\sum_{j=1}^{M_r}|w_{k,q,j}|^2 P_{k,j}\right)^{-1} - \sum_{k=1}^{N}\sum_{j=1}^{M_r}(P_{k,j})^{-1}. \tag{14}$$

In another example, the barrier function $g(P_{k,j})$ as presented below may be used, $$g(P_{k,j}) = \sum_{q=1}^{M_t}\log\left(P_{max,q} - \sum_{k=1}^{N}\sum_{j=1}^{M_r}|w_{k,q,j}|^2 P_{k,j}\right) + \sum_{k=1}^{N}\sum_{j=1}^{M_r}\log(P_{k,j}). \tag{15}$$

Next, exemplary operations of the parallel splitting unit 211 in the parallel processing unit 21 in FIG. 2 are described. The parallel splitting unit 211 in the parallel processing unit 21 receives the transmit weight components $w_{k,q,j}$ and the eigenvalues $\lambda_{k,j}$ supplied from the optimum transmit power calculation unit 13. The parallel splitting unit 211 splits a transmit stream into at most D transmit streams depending on bias of the distribution of the eigenvalues $\lambda_{k,j}$. In this embodiment, the number D is equal to the total number of eigenvalues, and the transmit stream is split into multiple transmit streams. For example, assuming that the total number of eigenvalues is equal to 10 and the number of transmit streams is equal to 10, these transmit streams may be split to the first through tenth sub-optimization units. Alternatively, two groups each including five transmit streams may be provided to the first and second sub-optimization units. Alternatively, one group of two transmit streams and the other group of eight transmit streams may be provided to the first and second sub-optimization units. In addition, identical or different power levels may be split to the sub-optimization units. For example, different power levels may be split to the individual sub-optimization units depending on the eigenvalue distribution (magnitude relationship).

Figure 3:
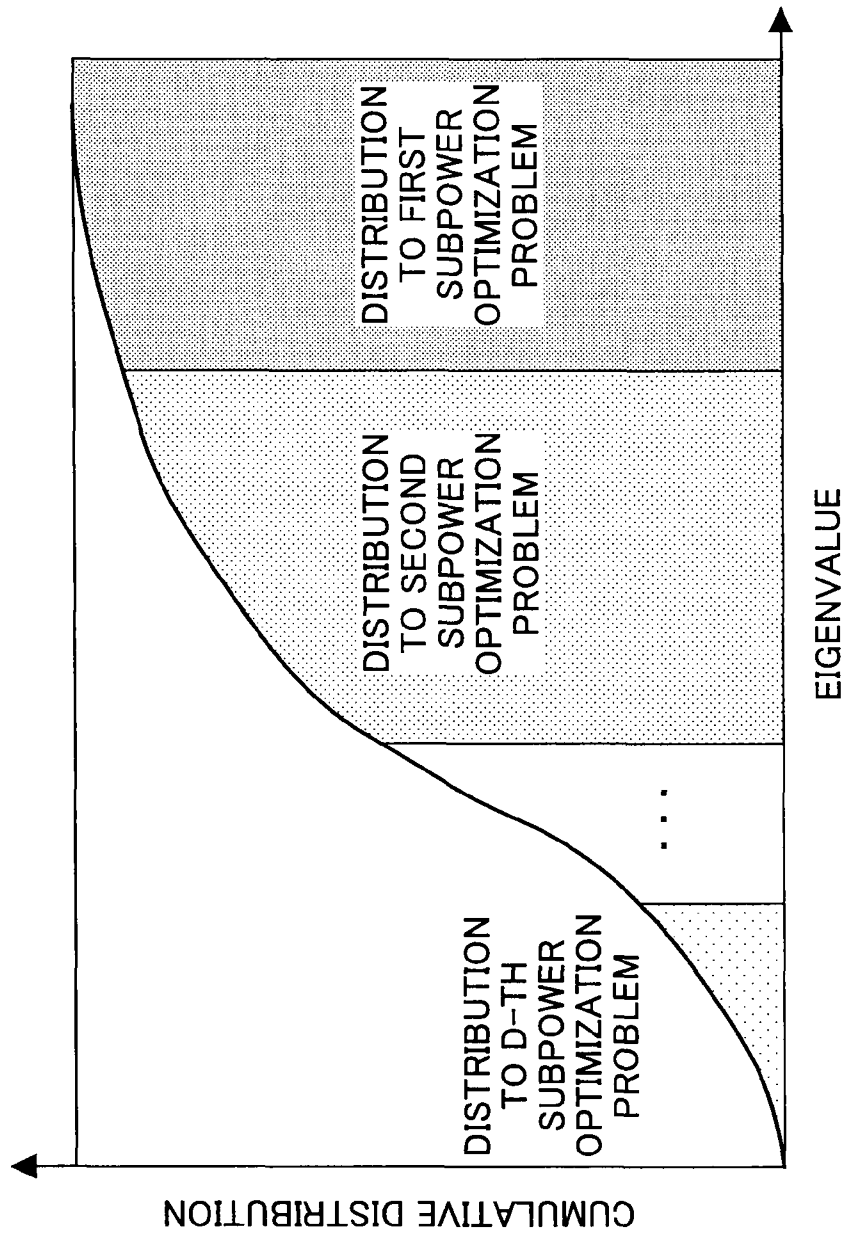
FIG. 3 illustrates an exemplary eigenvalue distribution characteristic for all users.

FIG. 3 illustrates exemplary split of sub power optimization problems depending on bias of the eigenvalue distribution. Since the eigenvalue distribution depends on a channel model in an implementation environment, the parallel splitting unit 211 perform division based on the eigenvalue distribution in that model. Also, transmit power levels $P_{k,j}$ are split to the individual sub power optimization problems depending on the bias of the eigenvalue distribution. From the viewpoint of data transmission efficiency, it is desirable that a greater amount of power be assigned to a sub-optimization unit to which a transmit stream associated with a greater eigenvalue belongs.

Figure 4:
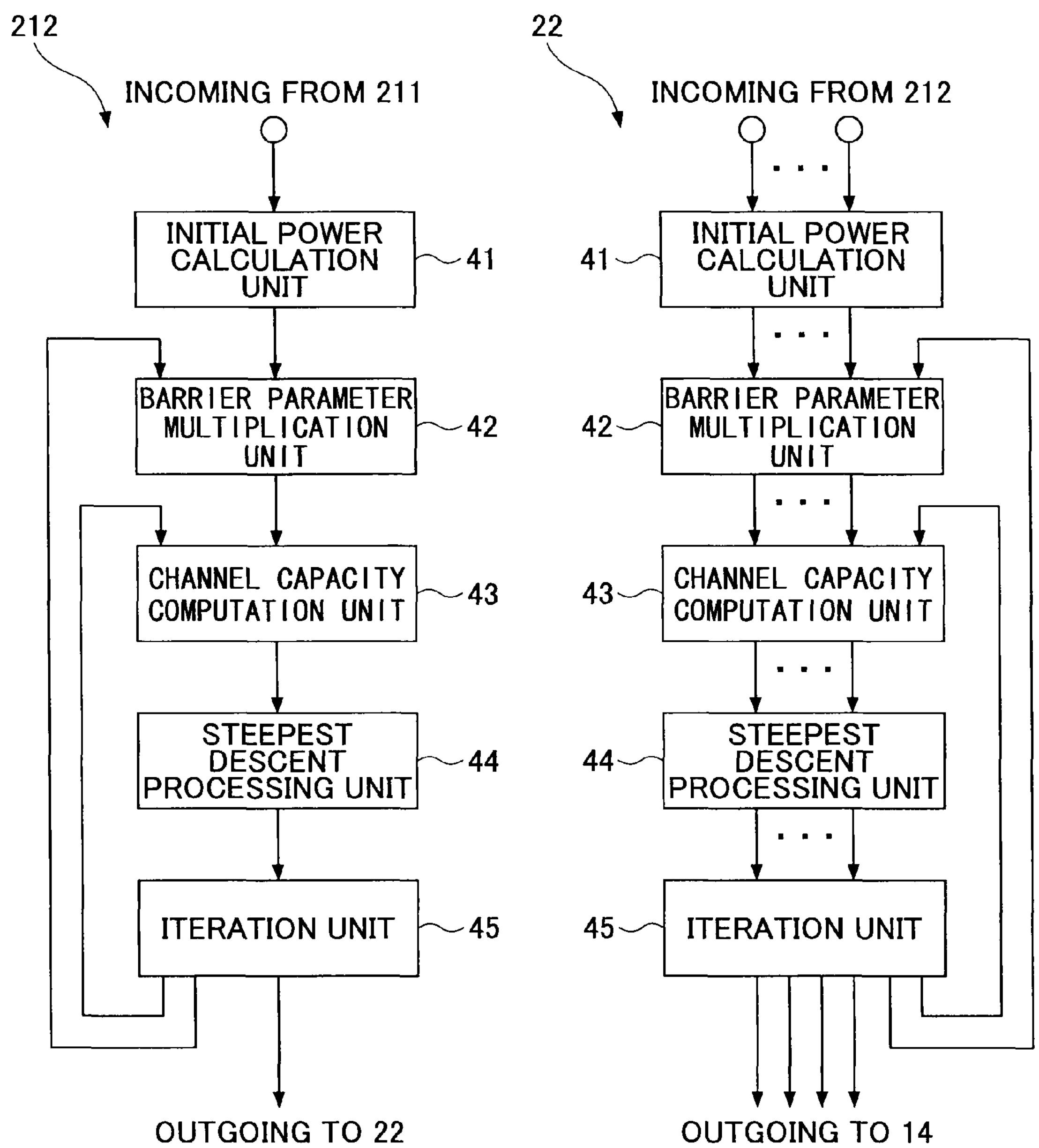
FIG. 4 illustrates exemplary arrangements of a sub-optimization and a merging unit in the optimum transmit power calculation unit according to the first embodiment.

FIG. 4 illustrates exemplary arrangements of the sub-optimization unit 212 and the merging unit 22 in the case where the optimization is performed in accordance with the interior point method combined with the steepest descent method. The sub-optimization unit 212 and the merging unit 22 each includes an initial power calculation unit 41, a barrier parameter multiplication unit 42, a channel capacity calculation unit 43, a steepest descent processing unit 44 and an iteration unit 45. In this embodiment, the above elements of the sub-optimization unit 212 and the merging unit 22 are configured to have the same structure and function. This configuration is not limited to the present embodiment, but it may be preferable that the sub-optimization unit 212 and the merging unit 22 have the same structure and function from the viewpoint of simplification of architecture.

Figure 5:
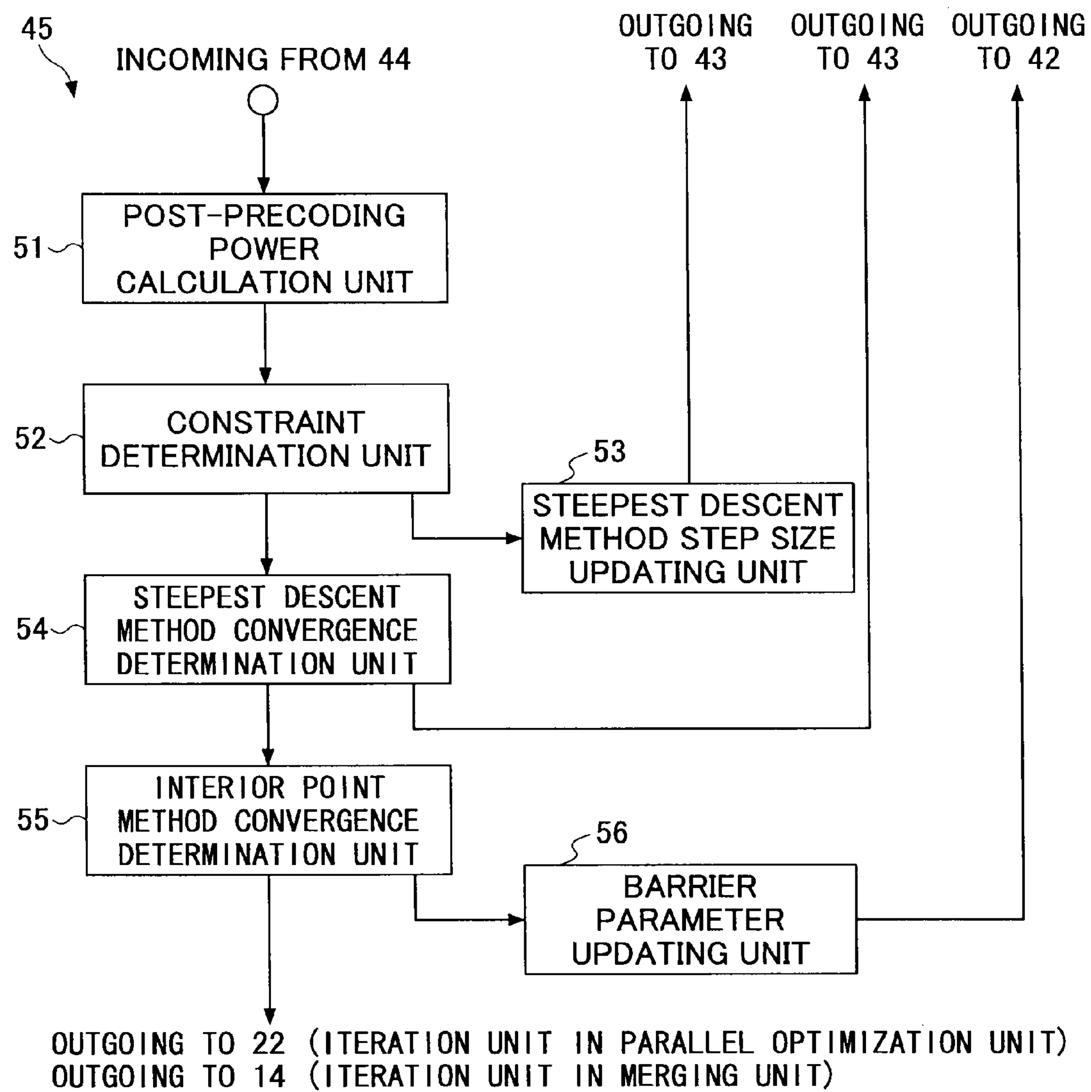
FIG. 5 illustrates an exemplary arrangement of an iteration unit in the sub-optimization unit and the merging unit in the optimum transmit power calculation unit according to the first embodiment.

FIG. 5 illustrates an exemplary detailed arrangement of the iteration unit 45 according to the first embodiment. The iteration unit 45 includes a post-precoding power calculation unit 51, a constraint determination unit 52, a steepest descent method step size updating unit 53, a steepest descent method convergence determination unit 54, an interior point method convergence determination unit 55 and a barrier parameter updating unit 56.

Exemplary specific operations of the optimization in accordance with the interior point method combined with the steepest descent method are described below. The individual sub-optimization units 212 receive transmit weight components $w_{k,q,j}$ and eigenvalues $\lambda_{k,j}$ corresponding to transmit streams split by the parallel splitting unit 21 in FIG. 2. Here, let a set of transmit streams split to the d-th sub-optimization unit 212 for the k-th user be $J_k^d$. The initial power calculation unit 41 in the individual sub-optimization units 212 in FIG. 4 uses an initial transmit power level $P_{k,j}$, the transmit weight components $w_{k,q,j}$ and the eigenvalue $\lambda_{k,j}$ to compute transmit power levels $P_q^d$ for individual transmit antennas in the d-th sub-optimization unit. The $P_q^d$ is represented in conjunction with the left-hand side of the formula (12) as follows, $$P_q^d = \sum_{k=1}^{N}\sum_{j \in J_k^d}|w_{k,q,j}|^2 P_{k,j}. \tag{16}$$

The transmit power level $P_q^d$ is supplied to the barrier parameter multiplication unit 42.

The barrier parameter multiplication unit 42 multiplies the barrier function with a barrier parameter r(i). The barrier parameter r(i) may be represented as follows, $$r(i+1) = r(i) \times \alpha \tag{17},$$

where i represents the number of step iterations in the interior point method, and $\alpha(<1)$ represents a barrier parameter scale factor.

The channel capacity calculation unit 43 uses the supplied $P_{k,j}$, $w_{k,q,j}$ and $\lambda_{k,j}$ to calculate channel capacities $C_k$ for individual users in accordance with the formula (9) and supplies the calculated channel capacities to the steepest descent processing unit 44. The steepest descent processing unit 44 optimizes the transmit power levels using the formula (13) associated with the optimization problem using the barrier function in accordance with the steepest descent method. The steepest descent method herein is one method for optimization through use of a gradient of an evaluation function as specified in the formula (13). Specifically, iterative operations as defined below are conducted in the steepest descent method, $$P_{k,j}(u+1) = P_{k,j}(u) + \beta \times \frac{\partial}{\partial P_{k,j}} F, \tag{18}$$

where the parameter u represents the number of iterations in the iteration operation, and the parameter β represents a step size.

The transmit power value $P_{k,j}$ optimized in the steepest descent processing unit 44 is supplied to the iteration unit 45 as described in FIG. 5.

The post-precoding power calculation unit 51 computes the transmit power levels $P_q^d$ for the individual transmit antennas based on the supplied $P_{k,j}$ and $w_{k,q,j}$ and supplies them to the constraint determination unit 52.

The constraint determination unit 52 determines whether conditions as presented below are satisfied, $$\begin{cases} P_q^d \le P_{max,q}^d \\ P_{k,j} \ge 0 \end{cases}, \tag{19}$$

where $P_{max,q}^d$ satisfies an equation as follows, $$\sum_{d=1}^{D} P_{max,q}^d = P_{max,q}. \tag{20}$$

If any of the conditions specified in the formulae (19) is not satisfied, the steepest descent method step size updating unit 53 decreases the step size β and returns it to the channel capacity calculation unit 43. Using the previous $P_{k,j}$ with respect to the formula (18), the constraint determination unit 52 iterates the above operations until the condition in the formula (19) is satisfied. If the constraint determination unit 52 determines that any of the conditions in formula (19) is satisfied, the transmit power level $P_{k,j}$ is supplied to the steepest descent method convergence determination unit 54.

The steepest descent method convergence determination unit 54 determines whether convergence conditions for the steepest descent method as presented below are satisfied, $$\begin{cases} \left\| \frac{\partial}{\partial P_{k,j}} F(u) \right\| = \left( \sum_{k=1}^{N} \sum_{j \in J_k^d} \left| \frac{\partial}{\partial P_{k,j}} F(u) \right|^2 \right)^{\frac{1}{2}} < \varepsilon_1 \\ \left| \min_k C_k^d(u) - \min_k C_k^d(u-1) \right| < \varepsilon_2 \\ u > I_{max} \end{cases}, \tag{21}$$

where $$C_k^d = \sum_{j \in J_k^d}^{r} \log_2(1 + SNR_{k,j}), \tag{22}$$

where the parameter u represents the number of iterations in the steepest descent method, and the parameter $I_{max}$ represents the maximum numbers of iterations. Also, the parameters $\epsilon_1$ and $\epsilon_2$ are sufficiently small values. Note that the above conditions are illustrative for convergence conditions for the steepest descent method and any other convergence conditions may be used. In other words, appropriate determination only has to be made as to whether the evaluation function F as specified in the formula (13) reaches an extreme value.

If none of the conditions in the formula (21) is satisfied, the steepest descent method convergence determination unit 54 returns the current transmit power level $P_{k,j}$ to the channel capacity calculation unit 43 and in turn iterates the same operations until any of the conditions in the formulae (21) is satisfied. On the other hand, if any of the conditions is satisfied, the steepest descent method convergence determination unit 54 supplies the current transmit power level $P_{k,j}$ to the interior point method convergence determination unit 55.

The interior point method convergence determination unit 55 determines whether step iteration convergence conditions for the interior point method as presented below are satisfied, $$\begin{cases} r(i) < \varepsilon_3 \\ \left| \min_k C_k^d(i) - \min_k C_k^d(i-1) \right| < \varepsilon_4, \end{cases} \tag{23}$$

where the parameter i represents the number of iterations in the interior point method. Also, the parameters $\epsilon_3$ and $\epsilon_4$ are sufficiently small values. Note that the above step iteration convergence conditions for the interior point method are illustrative and any other conditions may be used. In other words, appropriate determination only has to be made as to whether the evaluation function for the power optimization problem as specified in the formula (10) reaches an extreme value.

If none of the above convergence conditions is satisfied, the interior point method convergence determination unit 55 determines the current transmit power level $P_{k,j}$ to be an optimum solution at the barrier parameter r(i). The barrier parameter updating unit 56 decreases the barrier parameter in accordance with the formula (17). The barrier parameter updating unit 56 supplies the $P_{k,j}$ and r(i) to the barrier parameter multiplication unit 42, and the step iteration for the interior point method is reinitiated.

On the other hand, if any of the convergence conditions is satisfied, the interior point method convergence determination unit 55 determines the current transmit power level $P_{k,j}$ to be an optimum solution for the sub-optimization unit 212. The optimum solution is supplied from the parallel processing unit 21 to the merging unit 22.

The merging unit 22 uses the transmit power levels $P_{k,j}$ supplied from the parallel processing unit 21 as initial values to perform optimization in a manner similar to that of the parallel processing unit 21. As stated above, the merging unit 22 includes an initial power calculation unit 41, a barrier parameter multiplication unit 42, a channel capacity calculation unit 43, a steepest descent processing unit 44 and an iteration unit 45 as in the sub-optimization unit 212. The merging unit 22 supplies the resultant optimum transmit power level $P_{k,j}$ to the transmit power control unit 14.

In the merging unit 22, however, the parameter d is removed from the formulae (16), (19), (21) and (23), and the parameter $J_k^d$ is replaced with $\{1, 2, \ldots, M_r\}$. Also, the conditions in the formula (19) may be modified as follows, $$\begin{cases} P_q \le P_{max,q} \\ P_{k,j} \ge 0. \end{cases} \quad (24)$$

Figure 6:
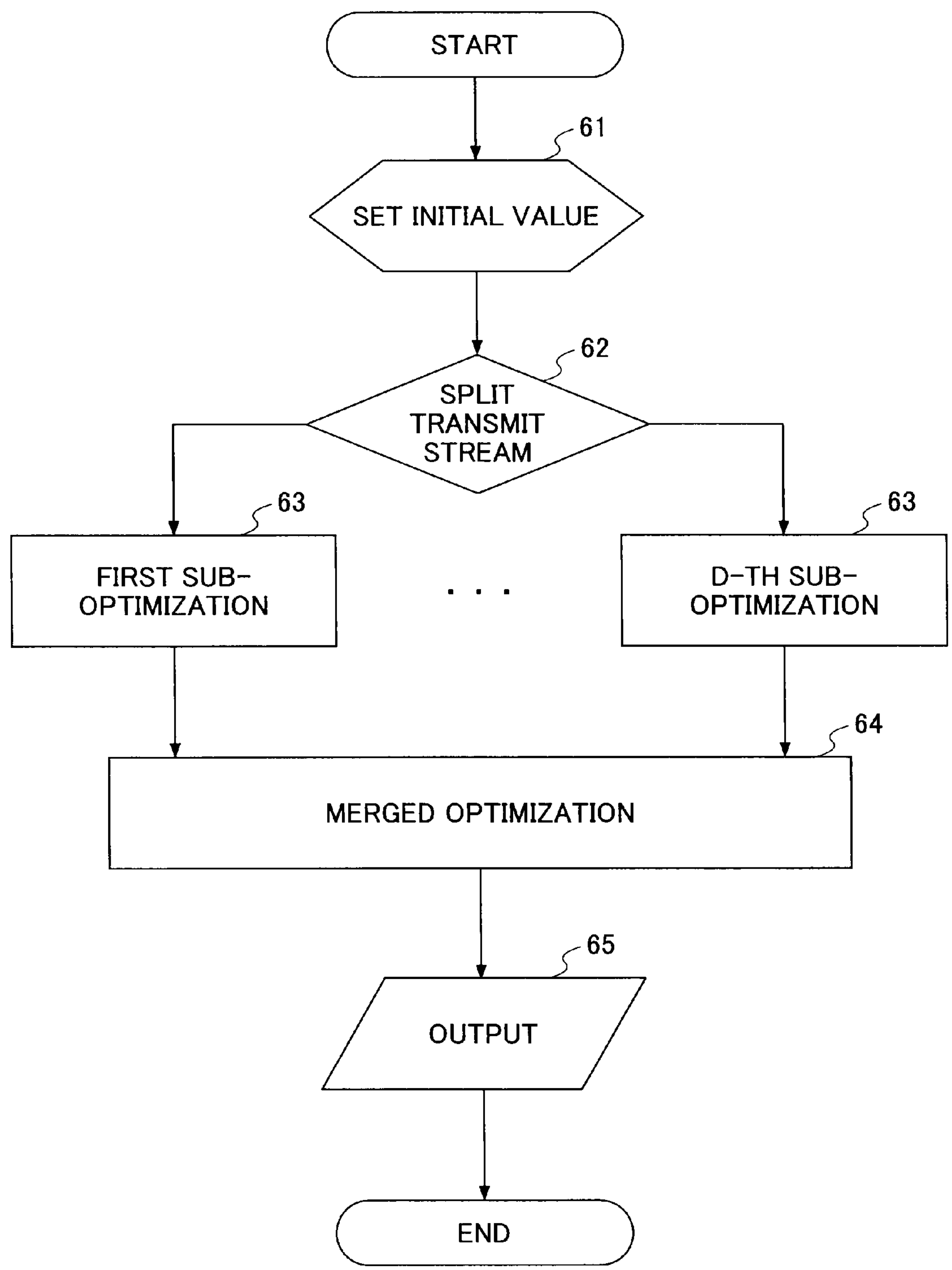
FIG. 6 is a flowchart of exemplary operations of the optimum transmit power calculation unit according to the first embodiment.

FIG. 6 is a flowchart illustrating operations of the optimum transmit power calculation unit 13 in FIG. 1. At step 61, an initial value of the barrier parameter r(i), an initial transmit power level $P_{k,j}$, the maximum number of iterations in the steepest descent method $I_{max}$ and parameters $\epsilon_1$ through $\epsilon_4$ are set.

At step 62, bias of an eigenvalue distribution for eigenvalues $\lambda_{k,j}$ supplied to the optimum transmit power calculation unit 13 is used to split transmit streams to the D sub-optimization units. In this embodiment, the initial values in the steepest descent method and the interior point method are set at step 61, but any other parameters suitable for applied optimization schemes and convergence conditions may be set.

At step 63, the individual D sub-optimization units perform the optimization and derive respective optimum solutions for associated transmit streams in the overall transmit stream for further processing.

At step 64, transmit power levels $P_{k,j}$ being incoming respective optimum solutions are used as initial transmit power levels for the individual transmit streams to solve the optimum problem for the overall transmit stream. The resultant optimum solution $P_{k,j}$ is supplied at step 65.

Figure 7:
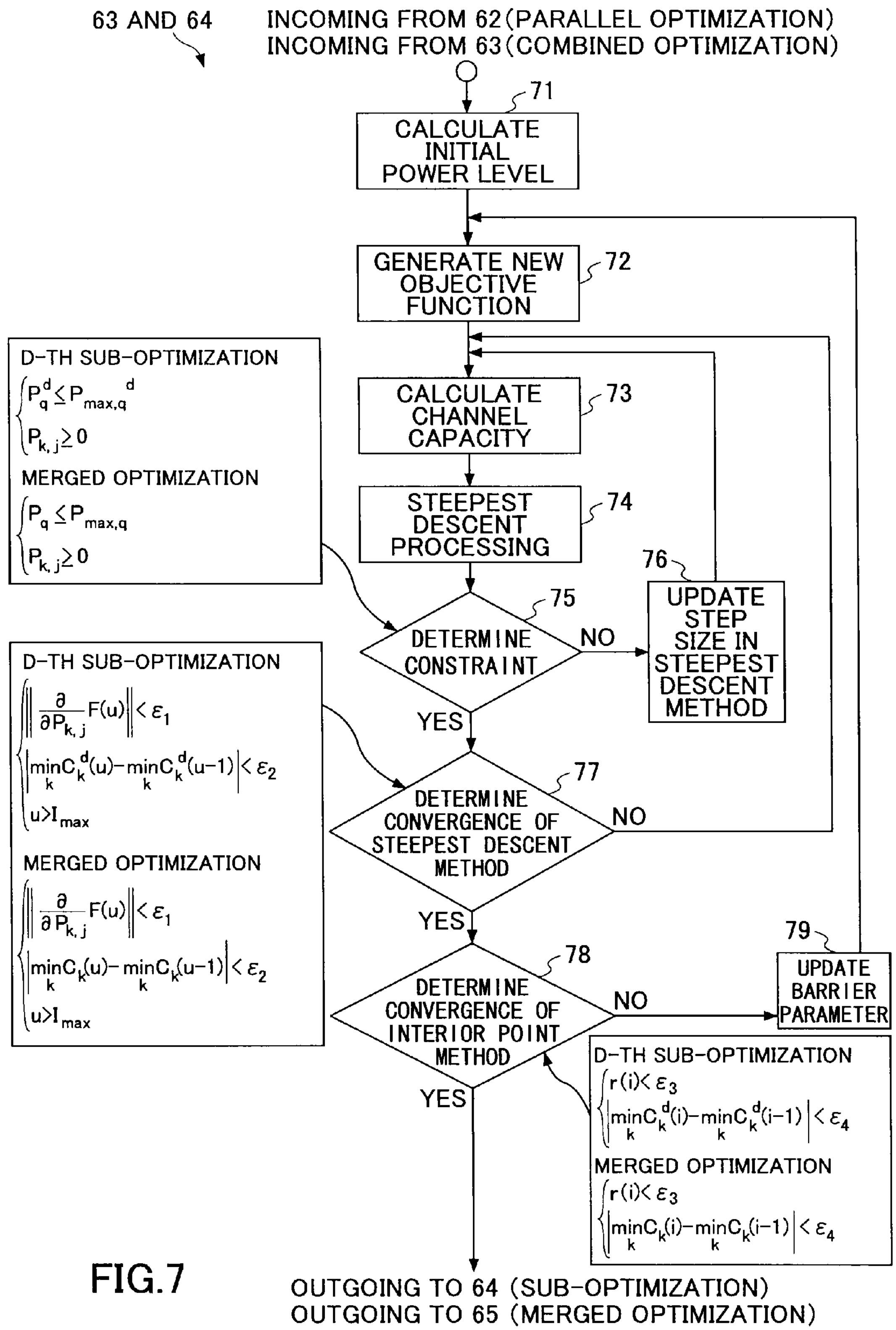
FIG. 7 is a flowchart of exemplary operations of the sub-optimization unit and the merging unit in the optimum transmit power calculation unit according to the first embodiment.

FIG. 7 is a flowchart illustrating steps 63, 64 in detail. At step 71, the transmit power levels $P_q^d$ are derived for individual transmit antennas as stated above.

At step 72, the barrier parameter r(i) as specified in the formula (17), an objective function for the new optimization problem, the transmit power level $P_q^d$ for the d-th transmit stream in the q-th transmit antenna and/or others are provided.

At step 73, respective channel capacities for individual users are calculated.

At step 74, a gradient of the objective function F, that is, a differential value, is derived based on the calculated channel capacities, and new power levels $P_{k,j}$ are calculated in accordance with the formula (18).

At step 75, respective transmit power levels $P_q^d$ for the individual transmit antennas are calculated in accordance with the formula (16), and it is determined whether the conditions in the formula (19) are satisfied. If any of the conditions is not satisfied, at step 76, the step size β is decreased. Then, the updated step size β is supplied to step 73, and the same operations are iterated until the conditions are satisfied at step 75.

On the other hand, if all of the conditions in the formula (19) are satisfied at step 75, at step 77, it is determined whether convergence conditions in the steepest descent method in the formula (21) are satisfied. If none of the conditions in the formula (21) is satisfied, the transmit power level $P_{k,j}$ is supplied to step 73, and the same operations are iterated until any of the conditions in the formula (21) is satisfied at step 77.

On the other hand, if any of the conditions is satisfied, at step 78, it is determined whether step iteration convergence conditions in the interior point method in the formula (23) are satisfied. If none of the convergence conditions in the formula (23) is satisfied, the current transmit power $P_{k,j}$ is determined as an optimum solution at the barrier parameter r(i). At step 79, the barrier parameter is decreased in accordance with the formula (17). Then, the process control returns to step 72, and the step iteration for the interior point method is performed at the transmit power level $P_{k,j}$ and the barrier parameter r(i).

On the other hand, if any of the convergence conditions in the formula (23) is satisfied, the current transmit power $P_{k,j}$ is supplied as an optimum solution for step 63 in FIG. 6. At step 64 in FIG. 6, the individual transmit power levels $P_{k,j}$ supplied from step 63 are used as initial values to perform steps 71 through 79 for the same optimization as step 63. The resultant optimum transmit power level $P_{k,j}$ is supplied at step 65.

In this embodiment, the optimization scheme using the steepest descent method in the interior point method processing is used. In other embodiments, other suitable optimization schemes may be used for the interior point method processing. Even in this case, the transmit power optimization problem can be split into sub transmit power optimization problems in accordance with the configuration and flowchart as illustrated in FIGS. 2 and 6 and respective results can be combined.

In the above optimization scheme, the optimization problem is solved such that channel capacities $C_k$ are made uniform over individual users. In other embodiments, the optimization problem may be solved such that channel capacity C for the overall system is maximized. In this case, the optimization problem is reformulated below, $$\text{maximize } C = \sum_{k=1}^{N} \sum_{j=1}^{M_r} \log_2(1 + SNR_{k,j}) \quad (25)$$

$$\text{s.t.} \sum_{k=1}^{N} \sum_{j=1}^{M_r} |w_{k,q,j}|^2 P_{k,j} \le P_{max,q} \quad (26)$$

$$P_{k,j} \ge 0 \ \forall\, k,\ j. \quad (27)$$

The optimization problem directed to maximize the channel capacity C for the overall system is referred to as Sum-rate criteria herein. The solution for that optimization problem is similar to Fairness criteria.

In the above-mentioned embodiments, the power limit values $P_{max,q}$ are illustratively provided for individual transmit antennas. In other embodiments, transmit antennas may be grouped into several groups, and the power limit values may be provided for the individual groups. Also, in this case, the above optimization scheme is available.

Figure 8:
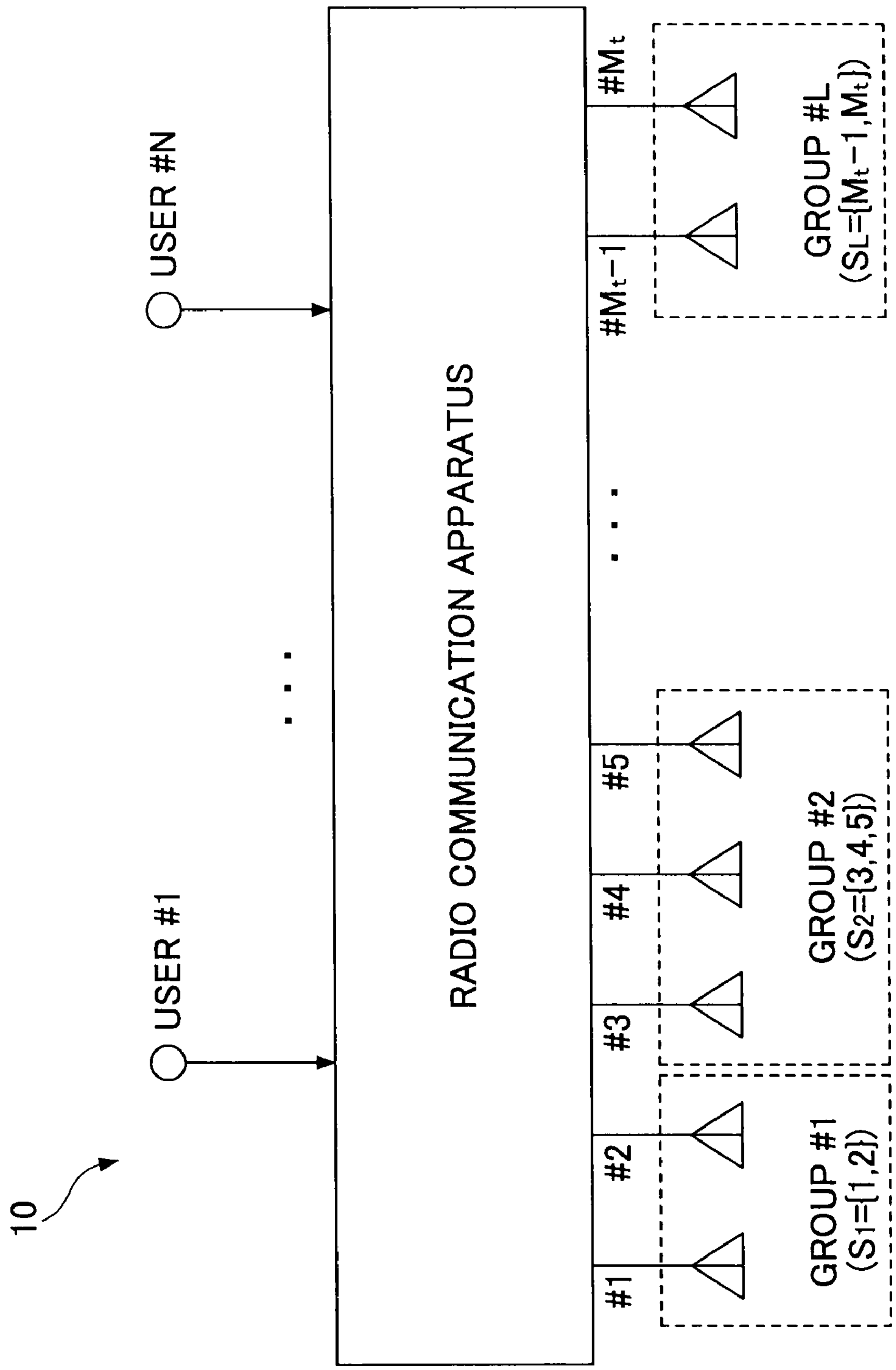
FIG. 8 schematically illustrates exemplary grouping of multiple transmit antennas in the radio communication apparatus according to the first embodiment.

FIG. 8 illustrates exemplary groups of transmit antennas in a radio communication apparatus. In the illustration, the reference symbol L ($1 \leqq l \leqq L$) represents the group number, and the reference symbol $S_l$ represents a set of transmit antenna numbers belonging to the group l. An optimization problem in accordance with the Fairness criteria for this embodiment is formulated, $$\text{maximize } \min_k C_k = \min_k \sum_{j=1}^{M_r} \log_2(1 + SNR_{k,j}) \quad (28)$$

$$\text{s.t.} \sum_{q \in S_l} \left[ \sum_{k=1}^{N} \sum_{j=1}^{M_r} |w_{k,q,j}|^2 P_{k,j} \right] \le P_{max,l} \quad (29)$$

$$P_{k,j} \geqq 0 \ \forall k,j \quad (30)$$

where the power limit value notation for group l is $P_{max,l}$. This optimization problem can be solved similar to the above-mentioned solution. Also, the optimization problem in accordance with the Sum-rate criteria can be also solved similarly.

In the above-mentioned embodiments, the BD-ZF scheme is illustratively applied for preceding, but the present embodiment can be applied to transmit power optimization problems through use of other preceding schemes.

Second Embodiment

In the first embodiment, it is assumed that multiple transmit antennas are installed on a radio communication apparatus. In the second embodiment, multiple transmit antennas may be separated from a radio communication apparatus and be coupled to the radio communication apparatus in a wired and/or wireless manner.

Figure 9:
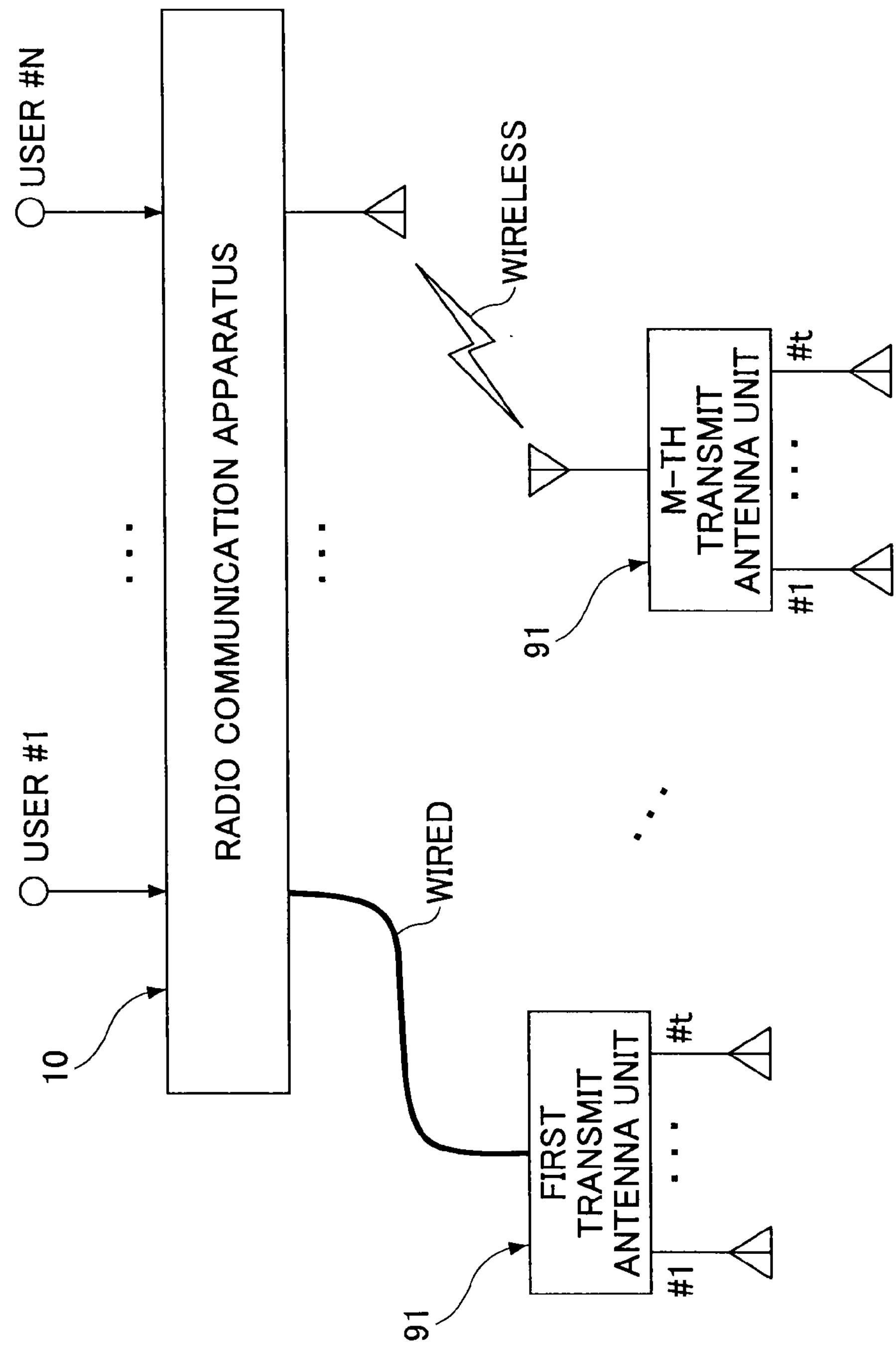
FIG. 9 schematically illustrates an exemplary arrangement of a radio communication apparatus according to a variation of one embodiment.

FIG. 9 illustrates a radio communication apparatus according to the second embodiment of the present invention. A radio communication apparatus 10 is coupled to transmit antenna units 91 each having multiple transmit antennas in a wired and/or wireless manner.

In operation, the radio communication apparatus 10 may operate in a similar manner to that of the first embodiment except that the radio communication apparatus 10 is separated from the transmit antenna units 91.

[Application Instance]

An exemplary application instance for the first embodiment as mentioned above is described below. The BD-ZF is used for preceding. Respective transmit power levels for individual transmit antennas are constrained to be lower than or equal to a power limit value $P_{max}$. Also, the barrier function as specified in the formula (14) is used for this simulation. Further, it is assumed that the number $M_t$ of transmit antennas is equal to 6, the number N of users is equal to 2, the number $M_r$ of user antennas is equal to 3, and three streams are space-multiplexed and transmitted for each user. Also, it is assumed that the power limit value $P_{max}$ is equal to ⅙ for each transmit antenna, and the total usable transmit power is equal to 1.

Also, it is assumed that the number D of the sub-optimization units is equal to 2. In this simulation, 10,000 patterns of MIMO channel matrices are used for optimization, and the results are averaged. For the propagation environment, it is assumed that respective MIMO channels for the users are independent identically distributed (i.i.d.) Rayleigh fading. Other parameters are set below. Note that the parameter $\epsilon_4$ is set to 0 to observe convergence in the present simulation.

[Parameters in the Parallel Processing Unit]

$P_{k,j}(0)=10^{-10}$, $r(0)=1.0$, $\alpha=0.05$, $I_{max}=2000$, $\epsilon_1 32$ $10^{-6}$, $\epsilon_2=10^{-11}$, and $\epsilon_3=10^{-3}$

[Parameters in the Merging Unit]

$P_{k,j}(0)$: $P_{k,j}$ supplied from the parallel processing unit is used as an initial value.

r(0): r(i) supplied from the parallel processing unit is used as an initial value.

Figure 10:
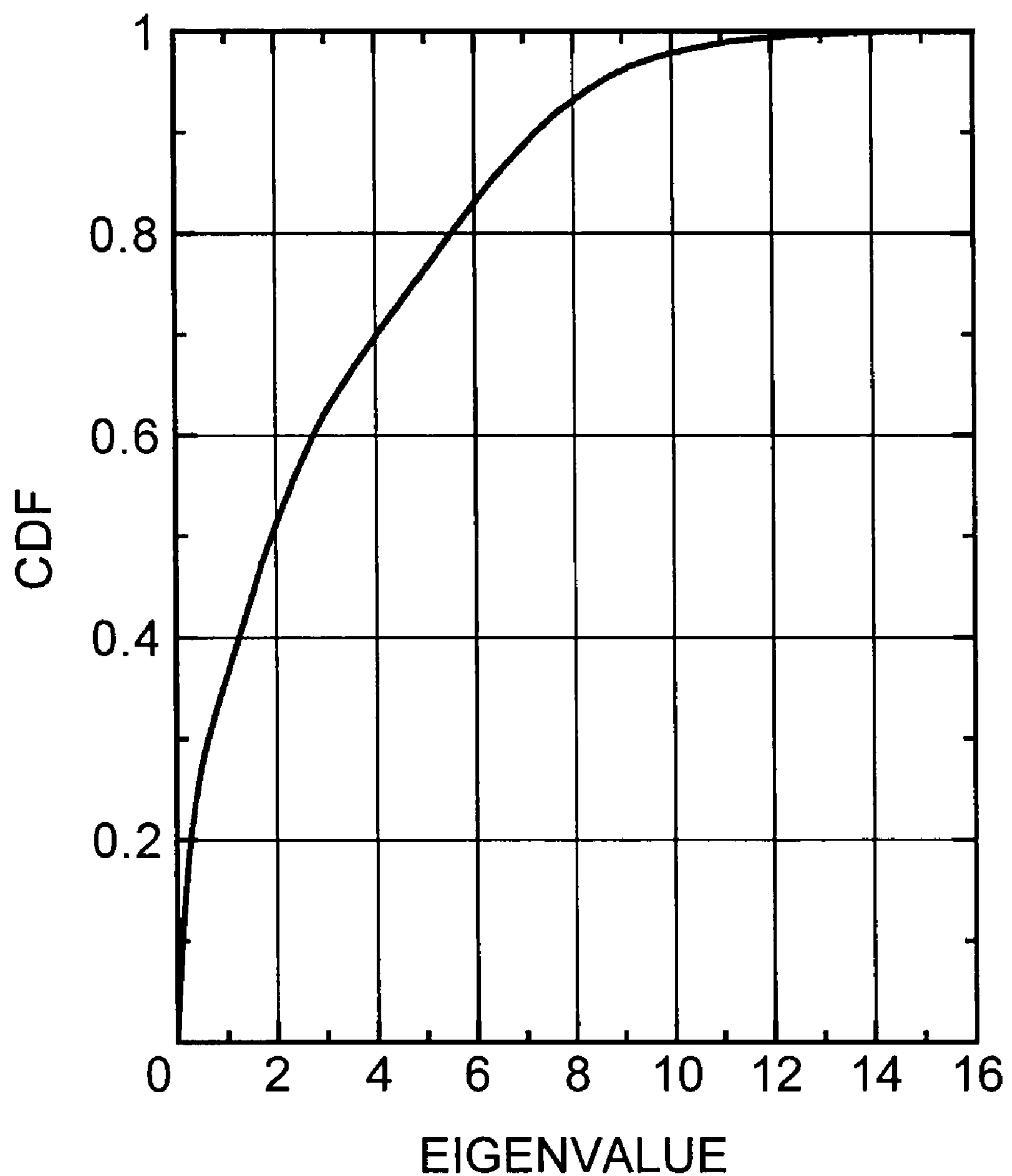
FIG. 10 illustrates exemplary eigenvalue distribution characteristics for all users.

$\alpha=0.05$, $I_{max}=2000$, $\epsilon_1=10^{-6}$, $\epsilon_2=10^{-11}$, and $\epsilon_3=10^{-17}$ FIG. 10 illustrates an eigenvalue distribution for all users in the present simulation. In this illustration, the horizontal axis represents the magnitude of the eigenvalue $\lambda_{k,j}$, and the vertical axis represents the associated cumulative distribution. From the illustration, it can be observed that 80% of all the users have eigenvalues smaller than about 5.5. It is assumed that the parallel splitting unit 211 in FIG. 2 provides the first sub-optimization unit 212 with transmit streams having eigenvalues $\lambda_{k,j} \geqq 5.5$ (upper 20% of transmit streams) and the second sub-optimization unit 212 with transmit streams having eigenvalues $\lambda_{k,j}<5.5$. In conjunction with this assumption, a transmit power limit value $P_{max}^1$ in the first sub-optimization unit 212 is set to $0.8\times P_{max}$ and a transmit power limit value $P_{max}^2$ in the second sub-optimization unit 212 is set to $0.2\times P_{max}$ in accordance with the Pareto Law.

Figure 11:
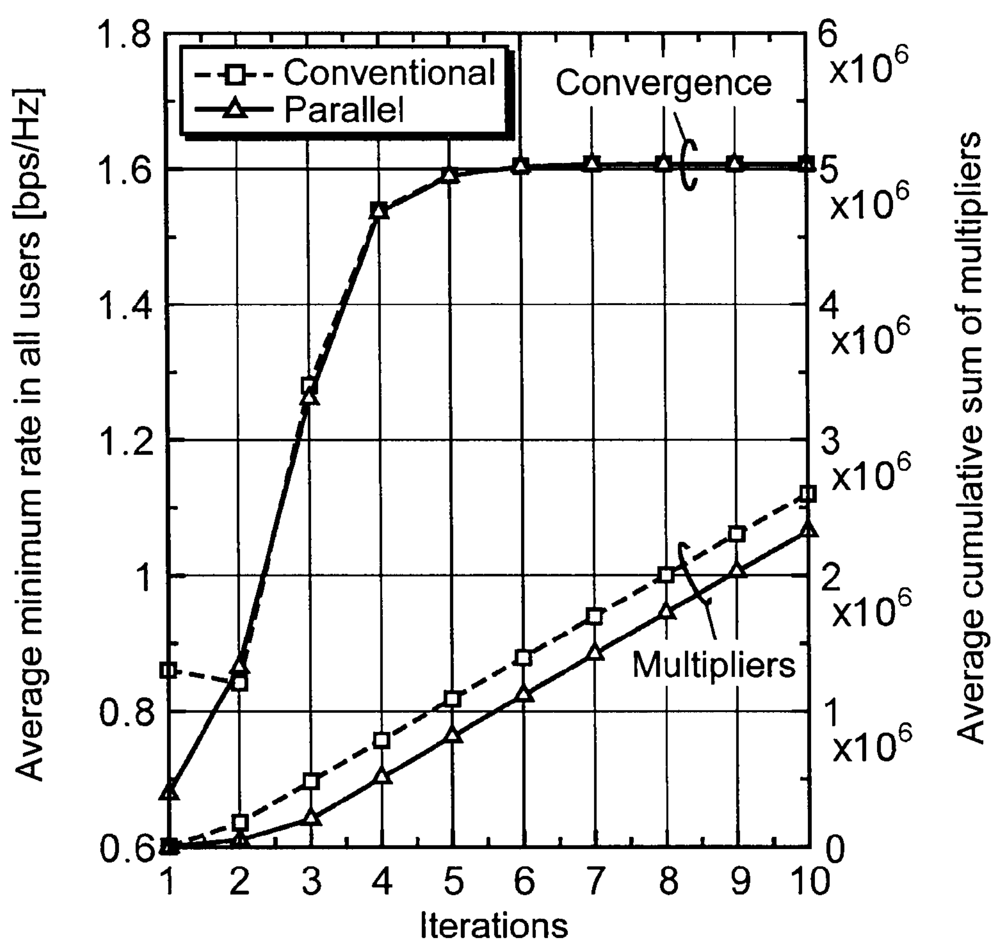
FIG. 11 illustrates convergence performances and computational complexity associated with the convergence in accordance with Fairness criteria according to one embodiment.

FIG. 11 illustrates an exemplary comparison of average minimum transmission rates for all users (channel capacity of minimum user channel capacity at step i in the interior point method) between optimization in a conventional scheme without parallel processing and optimization according to the present embodiment. The Fairness criteria is used in the optimization. In this illustration, the "Conventional" illustrates performances on the optimization in accordance with the conventional scheme without parallel processing. FIG. 11 illustrates not only convergence but also the accumulated number of multipliers. Note that the horizontal axis represents the i-th step iteration in the interior point method.

From the illustration in FIG. 11, it can be observed that 6 iterations (i=6) are required to obtain convergence value 1.60. To do so, the "Conventional" requires $1.40\times10^6$ multiplications while the present embodiment only requires $1.12\times10^6$ multiplications. In other words, the present embodiment can reduce the multiplications by about 20%. According to the present embodiment, an optimum transmission rate can be achieved with lower computational complexity than the conventional scheme.

Figure 12:
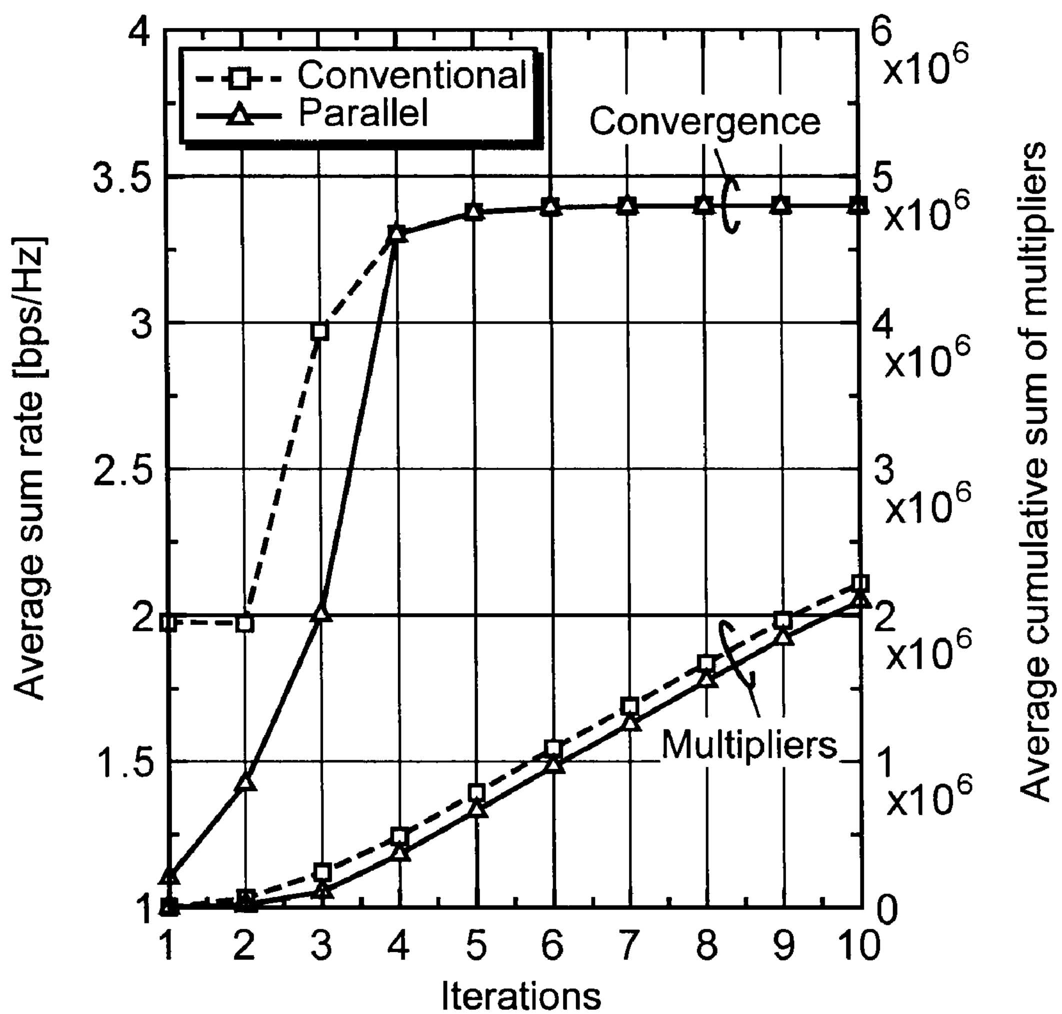
FIG. 12 illustrates convergence performances and computational complexity associated with the convergence in accordance with Sum-rate criteria according to one embodiment.

FIG. 12 illustrates a simulation result in the case where Sum-rate criteria is used for optimization. From the illustration in FIG. 12, it can be observed that 6 iterations (i=6) are required to obtain convergence value 3.39. To do so, the "Conventional" requires $1.09\times10^6$ multiplications while the present embodiment only requires $0.97\times10^6$ multiplications. In other words, the present embodiment can reduce the multiplications by about 11%.

For convenience, the present invention has been described with reference to the distinct embodiments, but separation of the embodiments is not essential to the present invention and two or more of the embodiments may be used together as needed. Some specific numerals have been used to facilitate understanding of the present invention, but unless otherwise noted, these numerals are simply illustrative and any other appropriate values may be used.

The present invention has been described with reference to the specific embodiments of the present invention, but the embodiments are simply illustrative and variations, modifications, alterations and substitutions could be contrived by those skilled in the art. For convenience of explanation, apparatuses according to the embodiments of the present invention have been described with reference to functional block diagrams, but these apparatuses may be implemented in hardware, software or combinations thereof. The present invention is not limited to the above embodiments, and variations, modifications, alterations and substitutions can be made by those skilled in the art without deviating from the spirit of the present invention.

This application is based upon and claims the benefit of priority of Japanese Patent Application No. 2008-125340, filed on May 12, 2008, the entire contents of which are incorporated herein by reference.

What is claimed is:

1. A radio communication apparatus for transmitting a radio signal to multiple users via multiple transmit antenna groups at appropriate transmit power levels, each of the transmit antenna groups including one or more transmit antennas, the transmit antenna groups having respective transmit power constraints, the apparatus comprising:

a precoding unit configured to precode multiple streams;

a splitting unit configured to split the precoded streams into two or more stream sets each including one or more streams;

a sub power optimization unit configured to execute iterative transmit power optimization algorithms on the split stream sets to determine respective transmit power levels for the individual stream sets;

a power optimization unit configured to execute an iterative transmit power optimization algorithm by using the determined transmit power levels as initial values for the iterative transmit power optimization algorithm to determine respective transmit power levels for the individual streams; and a transmission unit configured to transmit radio signals from individual transmit antennas at the determined transmit power levels.

2. The radio communication apparatus as claimed in claim 1, wherein the splitting unit is configured to split the precoded streams into two or more stream sets based on magnitude of multiple eigenvalues associated with a channel matrix for specifying respective radio channel states for the individual streams.

3. The radio communication apparatus as claimed in claim 1, wherein the sub power optimization unit is configured to use an interior point method combined with a steepest descent method to determine respective transmit power levels for the individual stream sets under the transmit power constraints of the individual transmit antennas or transmit antenna groups.

4. The radio communication apparatus as claimed in claim 1, wherein the power optimization unit is configured to use an interior point method combined with a steepest descent method to determine respective transmit power levels for the individual streams under the transmit power constraints of the individual transmit antennas or transmit antenna groups.

5. The radio communication apparatus as claimed in claim 3, wherein an iteration convergence condition for the steepest descent method in the sub power optimization unit or the power optimization unit comprises determination that an evaluation function of channel capacity substantially reaches an extreme value before or after updating of the transmit power levels.

6. The radio communication apparatus as claimed in claim 1, wherein the sub power optimization unit and/or the power optimization unit is configured to derive an optimum transmit power level to make respective channel capacities for individual users uniform.

7. The radio communication apparatus as claimed in claim 1, wherein the sub power optimization unit and/or the power optimization unit is configured to derive an optimum transmit power level to maximize channel capacity for an overall system.

8. A radio communication method for transmitting a radio signal to multiple users via multiple transmit antenna groups at appropriate transmit power levels, each of the transmit antenna groups including one or more transmit antennas, the transmit antenna groups having respective transmit power constraints, the method comprising:

precoding multiple streams;

splitting the precoded streams into two or more stream sets each including one or more streams;

executing iterative transmit power optimization algorithms on the split stream sets to determine respective transmit power levels for the individual stream sets;

executing an iterative transmit power optimization algorithm by using the determined transmit power levels as initial values for the iterative transmit power optimization algorithm to determine respective transmit power levels for the individual streams; and transmitting radio signals from individual transmit antennas at the determined transmit power levels.

9. The radio communication method as claimed in claim 8, wherein the dividing comprises splitting the precoded streams into two or more stream sets based on magnitudes of multiple eigenvalues associated with a channel matrix for specifying respective radio channel states for the individual streams.

10. The radio communication method as claimed in claim 8, wherein the performing an iterative transmit power optimization algorithm on each of the divided stream sets comprises using an interior point method combined with a steepest descent method to determine respective transmit power levels for the individual stream sets under the transmit power constraints of the individual transmit antennas or transmit antenna groups.

11. The radio communication method as claimed in claim 8, wherein the performing the iterative transmit power optimization algorithm by using the determined transmit power levels as initial values for the iterative transmit power optimization algorithm comprises using an interior point method combined with a steepest descent method to determine respective transmit power levels for the individual streams under the transmit power constraints of the individual transmit antennas or transmit antenna groups.

12. The radio communication method as claimed in claim 10, wherein an iteration convergence condition for the steepest descent method comprises determination that an evaluation function of channel capacity substantially reaches an extreme value before or after updating of the transmit power levels.

13. The radio communication method as claimed in claim 8, wherein the iterative transmit power optimization algorithm derives an optimum transmit power level to make respective channel capacities for individual users uniform.

14. The radio communication method as claimed in claim 8, wherein the iterative transmit power optimization algorithm derives an optimum transmit power level to maximize channel capacity for an overall system.

* * * * *